United States Patent [19]
Hanson

[11] Patent Number: 5,404,909
[45] Date of Patent: Apr. 11, 1995

[54] COUPLING DEVICE

[75] Inventor: Lowell R. Hanson, Cedar, Minn.

[73] Assignee: Parker-Hannifin Corporation, Cleveland, Ohio

[21] Appl. No.: 897,179

[22] Filed: Jun. 11, 1992

[51] Int. Cl.⁶ ............................................. F16L 37/28
[52] U.S. Cl. ............................ 137/614.06; 251/149.9; 137/797; 62/50.7
[58] Field of Search .............. 137/614, 614.01, 614.02, 137/614.04, 614.05, 614.06, 68.1, 797; 285/311, 312, 320, 904; 251/149.9, 149.6; 62/50.7

[56] References Cited

U.S. PATENT DOCUMENTS

| 3,472,482 | 10/1969 | Gardner . | |
|---|---|---|---|
| 3,664,634 | 5/1972 | Guertin et al. | 251/333 |
| 3,897,091 | 7/1975 | McMath et al. | 137/614.06 X |
| 4,030,524 | 6/1977 | McMath et al. | 137/614.06 |
| 4,567,924 | 2/1986 | Brown | 137/797 X |

FOREIGN PATENT DOCUMENTS

| 0371867 | 6/1990 | European Pat. Off. . |
| 1475880 | 2/1969 | Germany . |
| 8402171 | 6/1984 | WIPO . |
| 8707535 | 12/1987 | WIPO . |

Primary Examiner—Martin P. Schwadron
Assistant Examiner—Kevin L. Lee
Attorney, Agent, or Firm—Renner, Otto, Boisselle & Sklar

[57] ABSTRACT

A coupling device 10 includes a nozzle 11 and a receptacle 12. The receptacle 12 includes a poppet assembly 35 that is biased by a spring 41 to a closed position. The receptacle 12 also includes an interface sealing surface 31. The nozzle 11 includes a nozzle valve 75 having a poppet 76 and a valve seat 79. The nozzle 11 also includes an interface seal assembly 85 movable between opened and closed positions relative to the receptacle interface sealing surface 31. The valve seat 79 and the interface seal assembly 85 are both carried on a movable carrier 88, and an actuator assembly 95 is operably connected to effect movement of the poppet 76, the valve seat 79 and the interface seal assembly 85. The actuator assembly 95 holds the interface seal assembly 85 opened during coupling and uncoupling of the nozzle 11 and receptacle 12 and closed during opening and closing of the nozzle valve 75 and receptacle poppet assembly 35. A collar 48 locks the receptacle 12 to the nozzle 11. Frangible fasteners 52 break to permit separation of the receptacle 12 from the nozzle 11 under defined conditions, and the carrier 88 moves the valve seat 79 to engage the poppet 76 and close the nozzle valve 75 under such conditions.

32 Claims, 10 Drawing Sheets

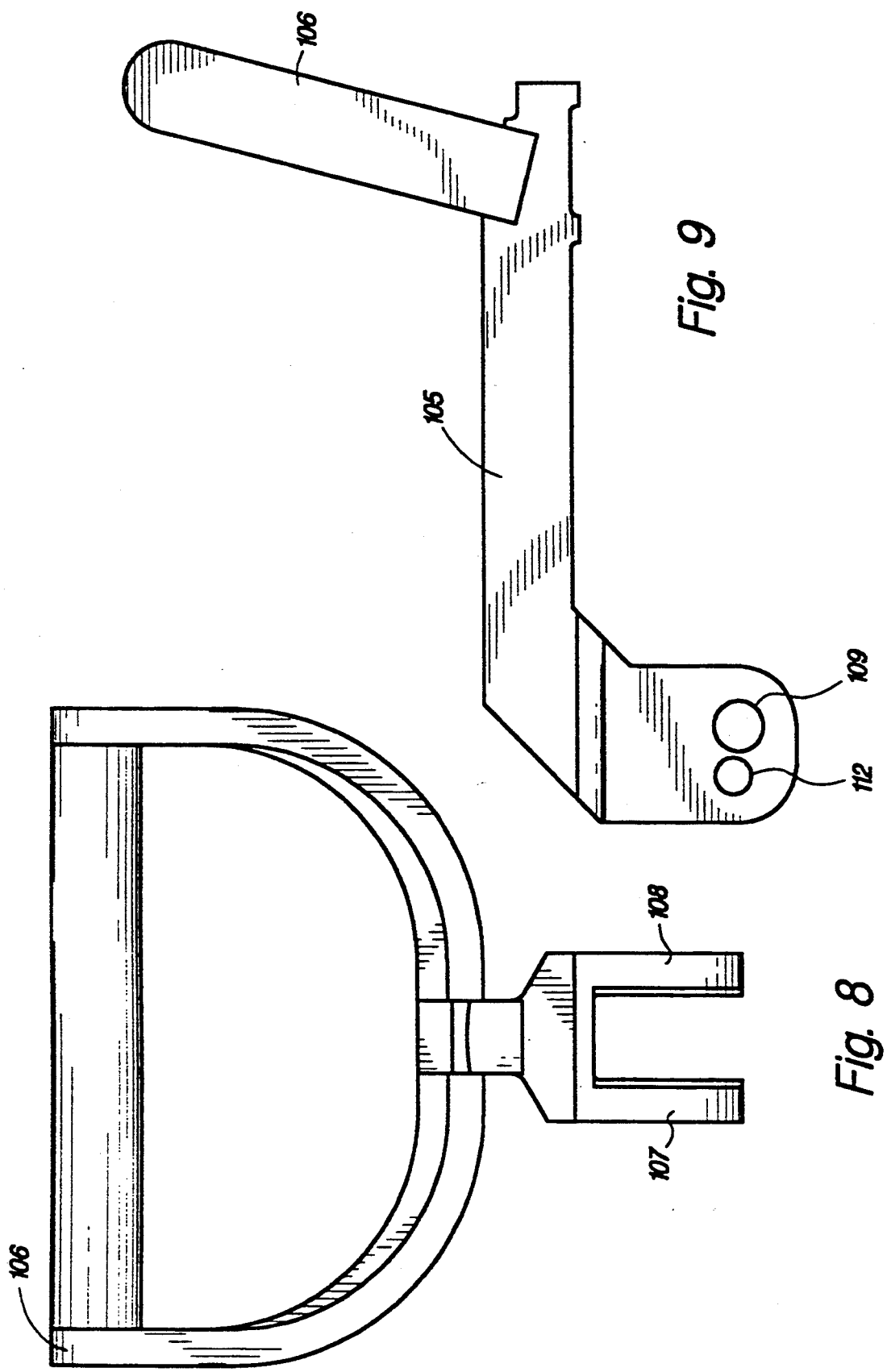

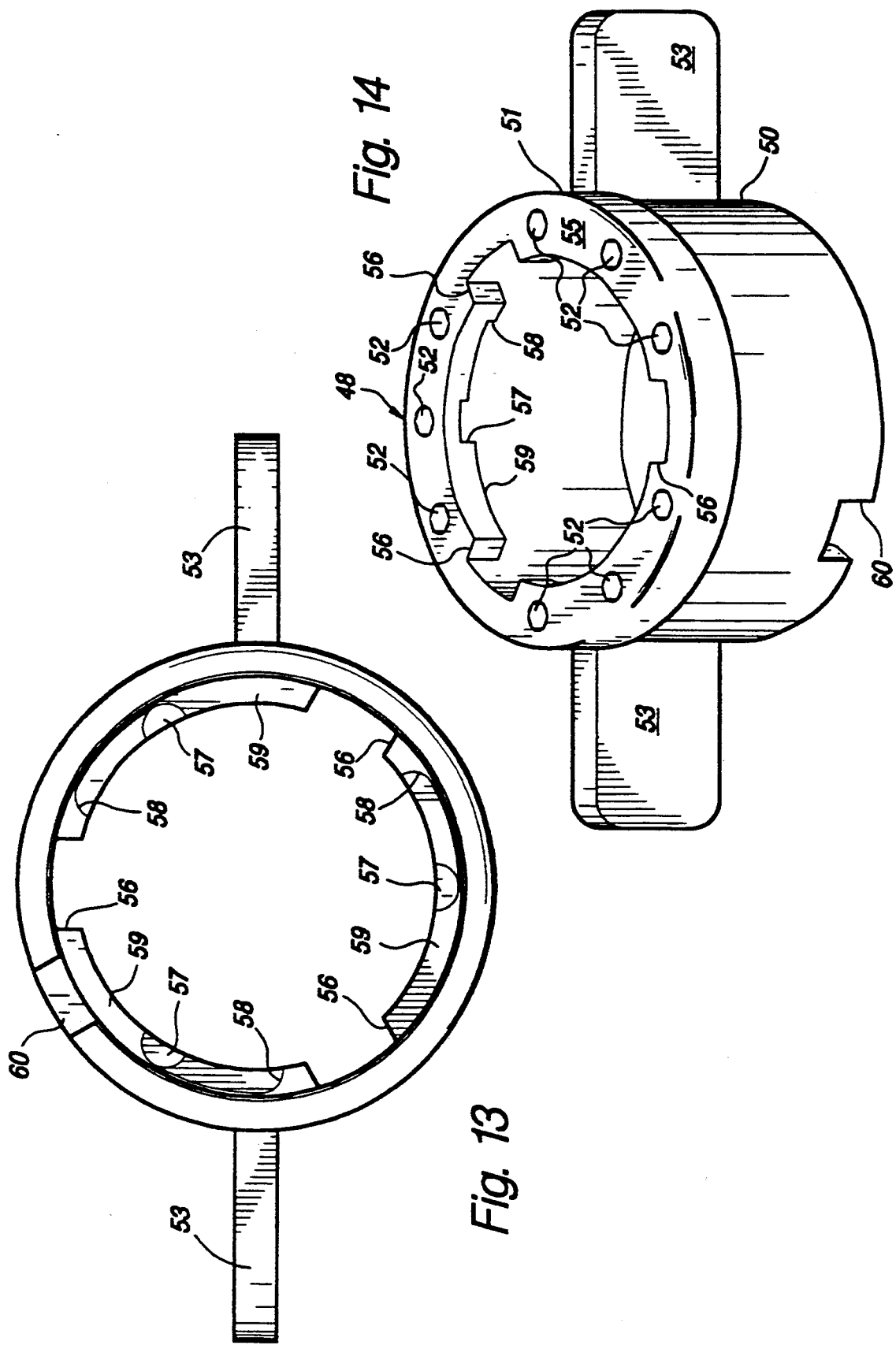

COUPLING DEVICE

BACKGROUND OF THE INVENTION

1. Field of the Invention

This invention relates to a valved coupling device particularly suited for use with cryogenic fluids.

2. Description of the Prior Art

Valved coupling devices are used to couple and uncouple conduits for conveying a wide variety of fluids. One such coupling device is used in the prior art for conveying liquid nitrogen at temperatures of approximately −320° F.

This particular prior art coupling includes a nozzle and a receptacle. The nozzle is connected to a supply container of the fluid, and the receptacle is connected to a container that is to be filled.

In this prior art coupling, the nozzle and the receptacle each include a valve. A lever operated actuator on the nozzle is rotated to open the nozzle valve and to push against and also open the receptacle valve to permit fluid flow through the coupling. When the nozzle and receptacle are to be uncoupled, the actuator mechanism closes the nozzle valve and permits a spring to close the receptacle valve, so that fluid cannot flow through the nozzle or through the receptacle when the nozzle and receptacle are uncoupled.

SUMMARY OF THE INVENTION

The present invention provides an improvement for valved coupling devices, and particularly for valved coupling devices that are used with cryogenic fluids. As used herein, the term cryogenic fluid means a fluid that is at a temperature at or below −150° F.

The invention provides a coupling that includes a nozzle and a receptacle, each of which has a valve for opening and closing fluid flow. The nozzle and receptacle are releasably interconnected by a locking collar, and interface sealing surfaces on the nozzle and the receptacle are engagable to prevent fluid flow outward from the interface between the nozzle and the receptacle under certain defined conditions and to permit such fluid flow under other conditions when the nozzle and the receptacle are coupled together.

The nozzle interface sealing surface is arranged on a carrier that is slidably disposed for axial movement relative to the nozzle housing. The carrier also provides a valve seat for the nozzle valve. An actuator on the nozzle effects axial movement of a nozzle valve popper toward and away from the nozzle valve seat and also effects axial movement of the nozzle interface sealing surface toward and away from the receptacle interface sealing surface.

With this arrangement, the interface sealing surfaces are separated during coupling and uncoupling of the nozzle and the receptacle. When the nozzle and receptacle valves are to be opened after coupling, the carrier is first moved by the actuator to cause engagement of the interface sealing surfaces before the nozzle and receptacle valves are opened. When the nozzle and receptacle valves are closed by the actuator, the actuator effects movement of the carrier to separate the interface sealing surfaces after the nozzle valve and the receptacle valve are closed. This vents any conveyed fluid that is trapped between the closed valves and the interface sealing surfaces, before the receptacle and nozzle are uncoupled.

The slidable carrier arrangement provided by the invention for carrying the nozzle interface sealing surface and the nozzle valve seat also provides an automatic closing of the nozzle valve. This automatic closing maintains the nozzle valve in a closed position if opening of the nozzle valve is attempted without a receptacle being coupled to the nozzle or if the receptacle breaks away from the nozzle while the nozzle valve is opened. Under these conditions, the carrier is displaced so that the carrier mounted nozzle valve seat engages the nozzle valve poppet to close the nozzle valve.

The locking surfaces that lock the nozzle and receptacle together are disposed on a rotatable locking collar and are frangibly connected to the nozzle housing. With this arrangement, a predetermined force acting to pull the receptacle away from the nozzle, such as might occur if the coupling device is used with a vehicle mounted supply tank and the vehicle is driven away before the coupling device is uncoupled, will cause separation of the receptacle and the nozzle at the location of the frangible connection without damaging the nozzle and receptacle valves and will result in automatic closing of the nozzle valve.

The actuator for the nozzle valve and carrier includes an elongated actuator lever that is pivotally arranged on the housing about a pivot axis that is perpendicular to the longitudinal axis of the actuator lever. An actuator link is connected to the nozzle valve poppet, and pivot connections pivotally interconnect the actuator lever and the actuator link and the nozzle valve poppet. All of the pivot connections are disposed outside of the nozzle fluid flow passage so that the pivot connections are not exposed to the conveyed fluid. In a single continuous and uninterrupted rotational movement of the actuator lever about its pivot axis on the housing in one direction after the receptacle and nozzle are coupled together, axial movement of the carrier is first effected to cause engagement of the interface sealing surfaces. Continued rotation of the actuator lever opens the nozzle valve and opens the receptacle valve. When the actuator lever is rotated about its pivot axis in the other direction, the receptacle valve and the nozzle valve are first closed. Continued rotation of the actuator lever in such other direction to its closed position effects axial movement of the carrier to separate the interface sealing surfaces and vent the chamber that is defined between the interface sealing surfaces and the closed valves. This movement of the actuator lever to its closed position also causes unlocking of the collar, to permit rotation of the collar and uncoupling of the receptacle.

These and other features and advantages of the invention are described more fully below with respect to the preferred embodiments of the invention.

BRIEF DESCRIPTION OF THE DRAWINGS

Referring now to the accompanying drawings:

FIG. 8 is an enlarged end view of the actuator lever for the nozzle shown in FIG. 1.

FIG. 9 is an enlarged side elevational view of the actuator lever shown in FIG. 8.

FIG. 13 is an enlarged end view of the locking collar for the nozzle shown in FIG. 1.

FIG. 14 is a perspective view of the collar shown in FIG. 13.

DETAILED DESCRIPTION OF THE PREFERRED EMBODIMENTS

Figure 1:
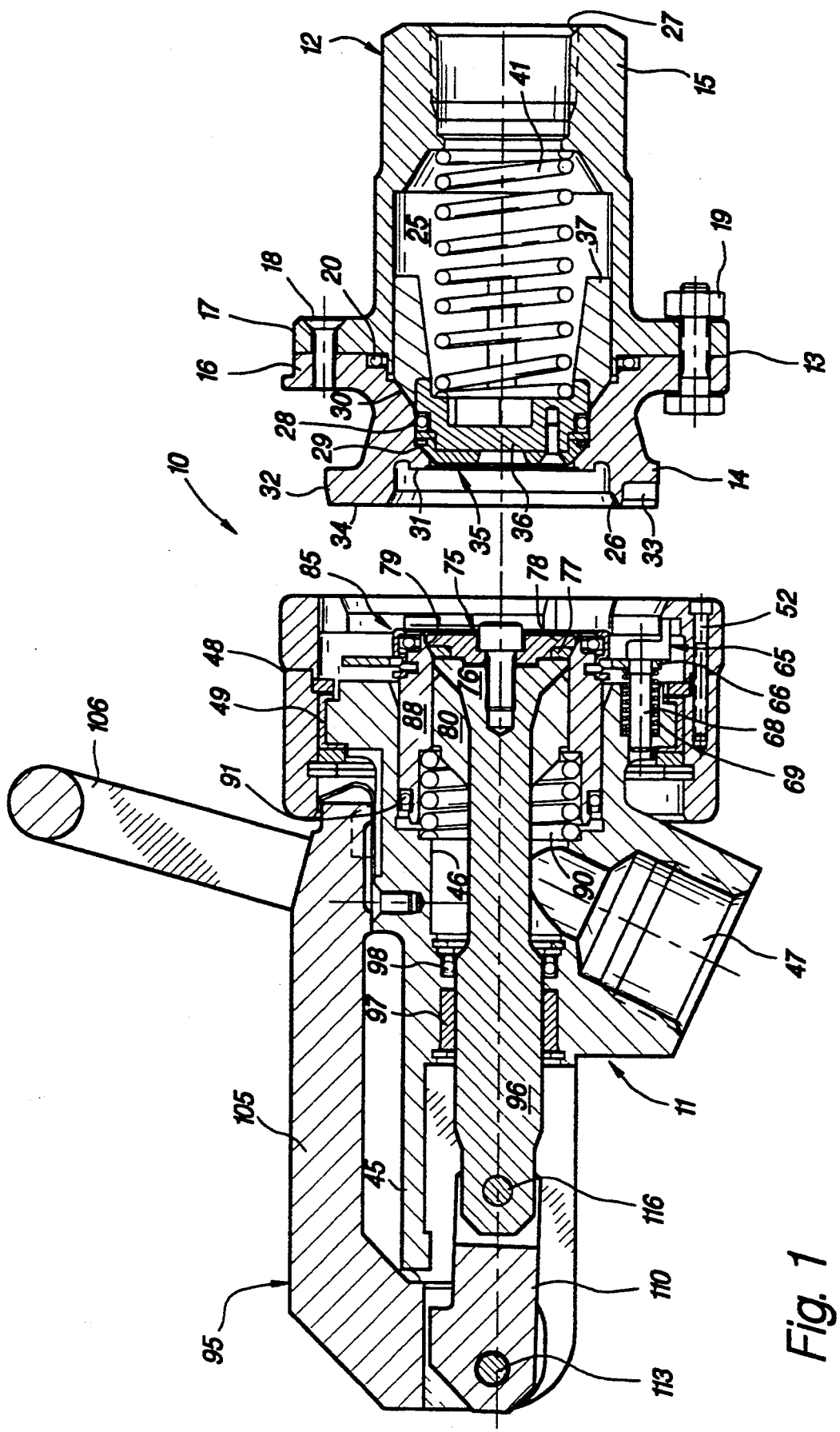
FIG. 1 is a cross-sectional side elevational view of the valved coupling according to the principles of this invention, with the nozzle and the receptacle shown in an uncoupled position.

Referring now to the drawings in greater detail, FIG. 1 shows a valved coupling 10 which includes a valved nozzle 11 and a valved receptacle 12.

The receptacle 12 includes a two piece receptacle housing 13 which includes a receptacle inlet section 14 and an receptacle outlet section 15. The inlet section 14 is preferably of cast aluminum bronze alloy and the outlet section 15 is preferably of cast aluminum alloy. The sections 14 and 15 are each of generally cylindrical construction. The sections 14 and 15 respectively include radially outwardly extending flanges 16 and 17. Each flange 16 and 17 extends circumferentially about the entire circumferential extent of its associated receptacle section, and the flanges 16 and 17 are held together by circumferentially spaced fasteners 18 and 19. An annular seal 20 (more fully described below) prevents fluid leakage between the receptacle sections 14 and 15.

A fluid flow passage 25 extends from end to end through the housing 13 and includes an inlet port 26 and an outlet port 27. The inlet port 26 is arranged to be connected to receive fluid from the nozzle 11 as more fully described below, and the outlet port 27 is connected to a device (not shown) that is to receive the conveyed fluid.

Figure 15:
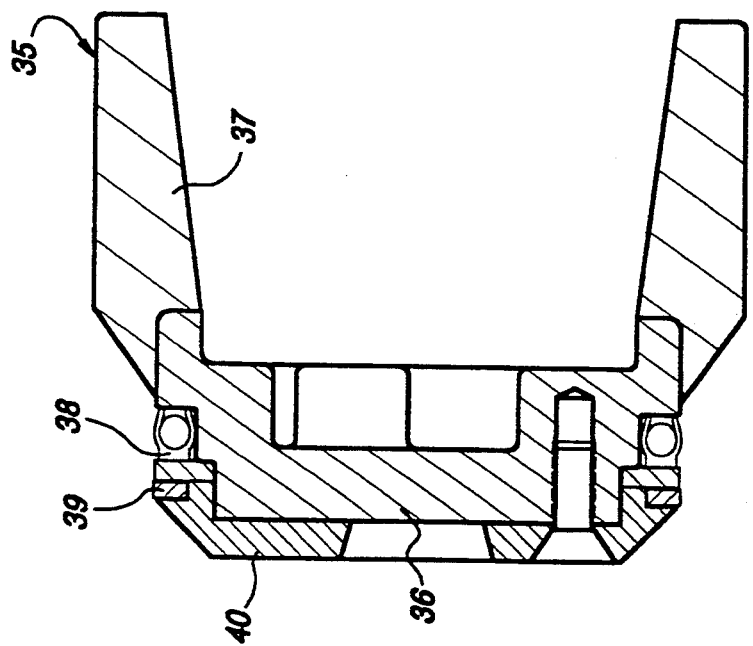
FIG. 15 is an enlarged cross-sectional side elevational view of the popper assembly for the receptacle shown in FIG. 1.

The fluid flow passage 25 also includes a cylindrical sealing surface 28, which extends between a smaller diameter abutment surface 29 and a conical portion 30. A poppet assembly 35 is slidably arranged for axial movement in the fluid flow passage 25 and cooperates with the sealing surface 28 to provide a valve in the receptacle 12. As best shown in FIG. 15, the poppet assembly 35 includes a disk shaped popper member 36 and a plurality of circumferentially spaced poppet guides 37. An annular seal 38 (more fully described below) is arranged on the exterior of the poppet member 36 for sealing engagement with the cylindrical sealing surface 28. The poppet assembly 35 also includes an ice scraper 39 which is received in the cylindrical sealing surface 28 with a light interference fit and which is constructed of polytetrafluoroethylene material. The ice scraper 39 is of generally flat annular construction, and the outside diameter of the ice scraper 39 engages the cylindrical sealing surface 28 when the popper assembly 35 is moved from an opened position to a closed position as described below, to remove ice from the cylindrical sealing surface 28 and permit sealing engagement of the seal 38 with the cylindrical sealing surface 28. A generally flat annular spacer is disposed between the seal 38 and the scraper 39. The seal 38 and the ice scraper 39 are retained on the poppet member 36 by a retainer 40 which is secured on the popper member 36 by three circumferentially spaced fasteners. A spring 41 biases the popper assembly 35 toward the closed position shown in FIG. 1, in which the popper assembly 35 engages the abutment surface 29.

Figure 6:
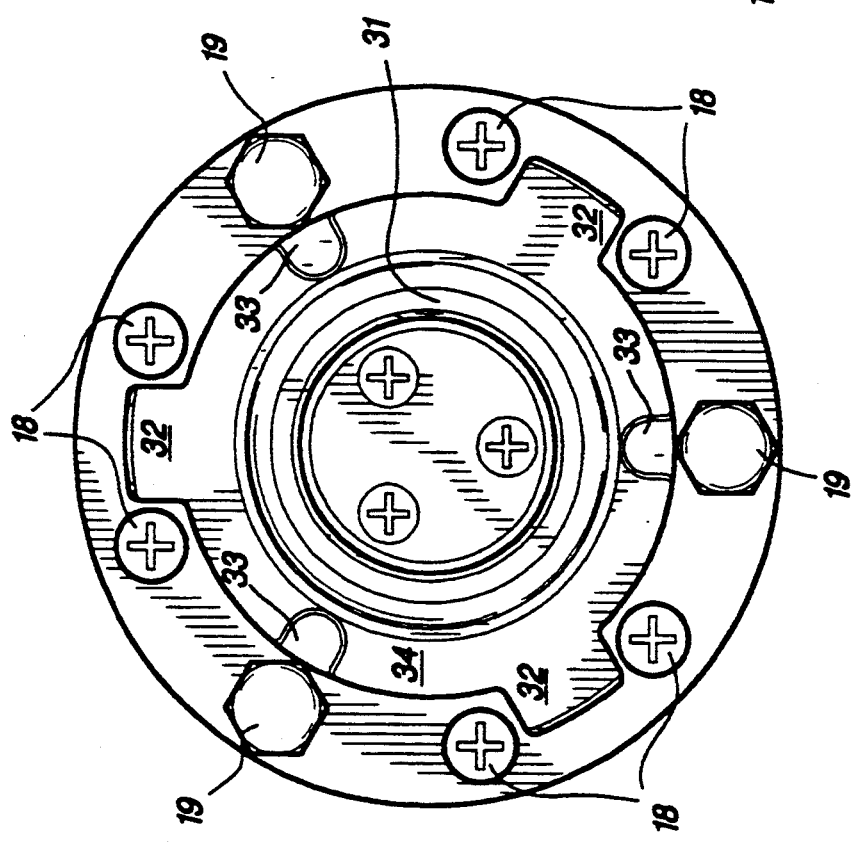
FIG. 6 is an enlarged plan view of the left end of the receptacle shown in FIG. 1.

Referring now particularly to FIGS. 1 and 6, the receptacle inlet section 14 includes an outwardly facing smooth annular interface sealing surface 31 associated with the inlet port 26. As described more fully below, the interface sealing surface 31 cooperates with a mating interface sealing surface of the nozzle 11. The inlet section 14 also includes three circumferentially spaced apart lugs 32. The lugs 32 provide locking surfaces which cooperate with locking surfaces described more fully below on the nozzle 11 to lock the receptacle 12 to the nozzle 11. The receptacle inlet section 14 also includes three circumferentially spaced slots 33 and an outwardly facing generally flat end face 34 which extends continuously between adjacent slots 33.

Referring to FIG. 1, the nozzle 11 includes a generally cylindrical housing 45 of cast aluminum alloy construction. The housing 45 has a bore 46 extending axially from end to end through the housing. An inlet port 47 is arranged in the side of the housing 45 and intersects the bore 46. The inlet port 47 is arranged to be connected by a flexible conduit (not shown) to a fluid supply, such as a cryogenic supply tank (not shown) filled with liquid natural gas at a temperature of approximately −260° F. The inlet port 47 and the bore 46 provide a fluid flow passage through the housing 45.

Referring now to FIGS. 1, 13, and 14, a generally cylindrical collar 48 is rotatably disposed on the exterior surface of the housing 45. A polytetrafluoroethylene bearing 49 provides smooth rotational movement of the collar 48, and snap rings and spacers secure the collar 48 against axial movement relative to the housing 45. The collar 48 is of two piece construction and includes a main collar portion 50 and a frangible collar portion 51. The frangible collar portion 51 is secured to the main collar portion 50 by frangible fasteners 52. As explained further below, the fasteners 52 are arranged to break so that the frangible collar portion 51 can separate from the main collar portion 50 and permit separation of the receptacle 12 from the nozzle 11 without adversely affecting the integrity of the valves in the nozzle 11 and receptacle 12 under certain conditions.

As further shown in FIGS. 13 and 14, the collar 48 further includes radially opposite gripping portions 53 that may be gripped by the user of the coupling 10 to rotate the collar 48. The collar 48 also includes an annular end wall 55 having three circumferentially spaced slots 56. The inwardly facing surface of the end wall 55 between each pair of slots 56 is identical and includes a slot 57 and an abutment surface 58. As explained further below, the slot 57 cooperates with a lock ring assembly of the nozzle 11 to prevent rotational movement of the collar 48 in either direction whenever the receptacle 12 is disconnected from the nozzle 11. As also explained further below, the abutment surface 58 also cooperates with the lock ring assembly of the nozzle 11 to limit rotational movement of the collar 48 in one direction when the receptacle 12 is fastened to the nozzle 11. Each inwardly facing surface of the end wall 55 between adjacent slots 56 also includes a locking surface 59. As described more fully below, the locking surfaces 59 engage locking surfaces on the lugs 32 of the receptacle 12 to lock the receptacle 12 to the nozzle 11 during operation of the coupling 10. The cylindrical wall of the collar 48 includes a slot 60 which, as described further below, cooperates with an actuator lever to permit movement of the actuator lever only when the receptacle 12 is locked on the nozzle 11. A locking member 61 (FIG. 3) is provided on the outer peripheral surface of the housing 45 by a suitable fastener. The locking member 61 is made of flat steel that is bent in the shape shown in FIG. 3 and has a width that is slightly less than the width of the slot 60 (FIG. 14) so that the free end of the locking member 61 is received within the slot 60 when the collar 48 is in the position shown in FIGS. 3 and 4 and described further below.

Figure 12:
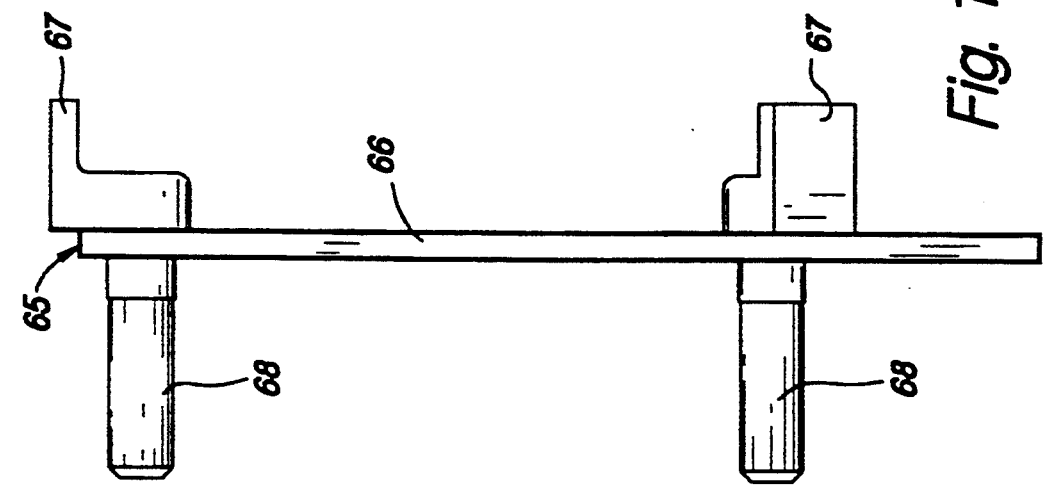
FIG. 12 is a side elevational view of the lock ring subassembly shown in FIG. 11.
Figure 11:
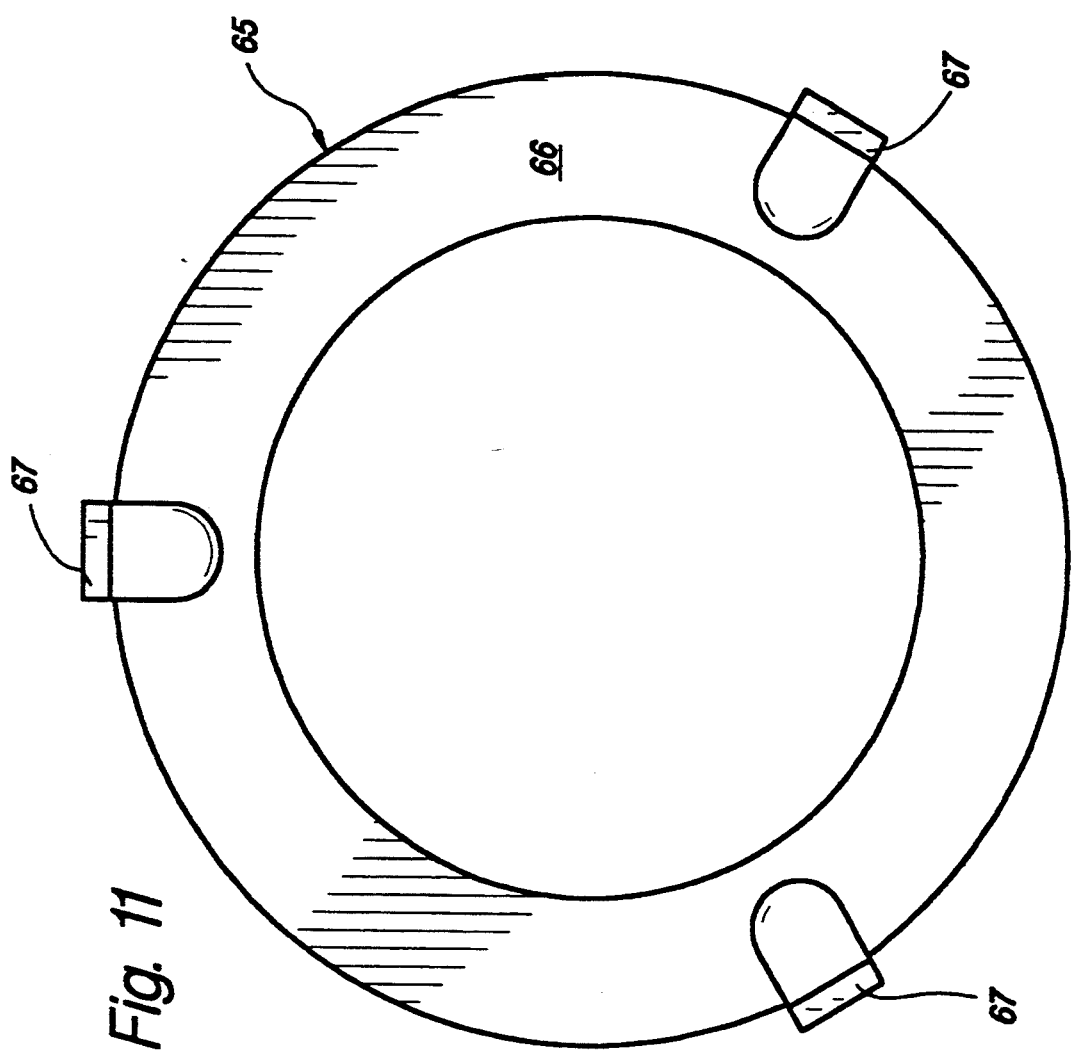
FIG. 11 is an enlarged end view of the lock ring subassembly for the nozzle shown in FIG. 1.

Referring now to FIGS. 1, 11, and 12, the nozzle 11 further includes a lock ring assembly 65. The lock ring assembly 65 includes a generally flat annular plate 66. Three identical angle lock members 67 are fastened to the plate 66 by pins 68. The pins 68 are preferably cast integrally with the angle lock members 67 and extend from the angle lock members 67 through the lock plate 66 and into a bore in the nozzle housing 45. A spring 69 is concentrically disposed about the free end of each pin 68, to bias the plate 66 and lock members 67 outwardly as viewed in FIG. 1. As described more fully below, the lock ring assembly 65 secures the collar 48 against rotation by engagement of the angle lock members 67 with the slots 57 (FIGS. 13 and 14) when the receptacle 12 is disconnected from the nozzle 11. The lock ring assembly 65 also limits rotation of the collar 48 by engagement of the lock members 67 with the abutment surfaces 58 (FIGS. 13 and 14) when the receptacle 12 is coupled to the nozzle 11.

Referring to FIG. 1, the nozzle 12 further includes a nozzle valve 75. The nozzle valve 75 includes a poppet 76 which is axially slidable in the bore 46 of the nozzle housing 45. The poppet 76 includes a polytetrafluoroethylene seal 77. A retainer 78 is held in place by a suitable fastener and secures the seal 77 in place. The nozzle valve 75 also includes a conical valve seat 79 which cooperates with the poppet 76 to open and close the fluid flow passage through the nozzle 12. A plurality of circumferentially spaced apart guides 80 are provided on the outer peripheral surface of the poppet 76. The guides 80 are fixed to and move axially with the poppet 76.

Figure 10:
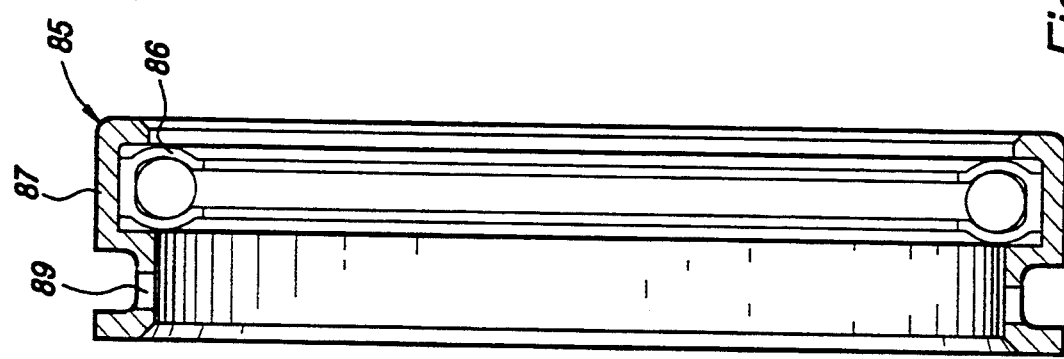
FIG. 10 is an enlarged cross-sectional side elevational view of the nozzle interface seal for the nozzle shown in FIG. 1.

Referring now to FIGS. 1 and 10, the nozzle 11 further includes an interface seal assembly 85. The interface seal assembly 85 includes an interface seal 86 and a seal retainer 87. The seal retainer 87 is fastened to a carrier 88 by a D ring which extends through radially opposite holes 89. The interface seal 86 (described more fully below) provides an interface sealing surface that is carried by the carrier 88 and that seals against the interface sealing surface 31 of the receptacle 12 in a manner more fully described below. The carrier 88 is a generally cylindrical member, and a spring 90 acts between the housing 45 and the carrier 88 to bias the carrier 88 axially outwardly. A seal 91 (described more fully below) is disposed on the outer peripheral surface of the carrier 88 and seals against the bore 46 to prevent fluid leakage between the carrier 88 and the bore 46.

Referring now to FIGS. 1, 7, 8, and 9, the interface seal assembly 85 and the nozzle valve 75 and the carrier 88 are all operably connected to an actuator assembly 95. The actuator assembly 95 includes an actuator member 96 which in the preferred embodiment is integral with the nozzle valve poppet 76. The actuator member 96 is carried by a polytetrafluoroethylene bearing 97 disposed at the rearward end of the bore 46, and a seal 98 (described more fully below) prevents fluid leakage between the actuator member 96 and the bore 46.

Figure 7:
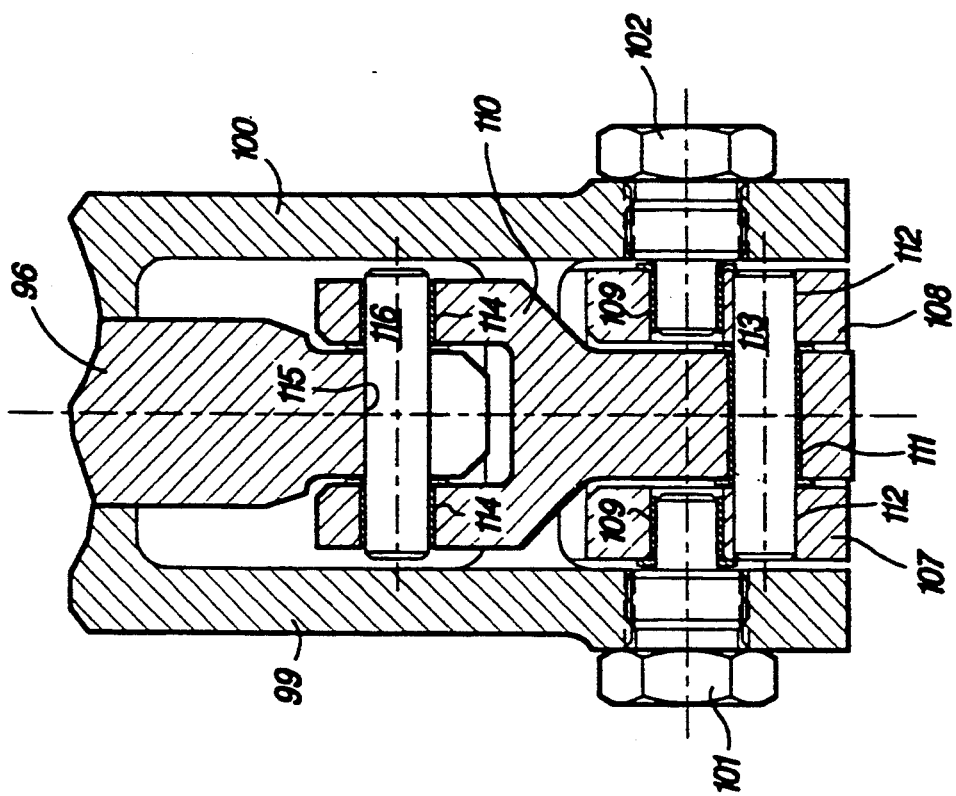
FIG. 7 is an enlarged cross-sectional view of the pivot connections for the actuator assembly of the nozzle shown in FIG. 1.

The housing 45 includes a rearwardly extending portion that provides two generally flat parallel legs 99 and 100 (see FIG. 7). The rearmost portions of the legs 99 and 100 include two threaded bores, the bores receive pinions 101 and 102 respectively.

The actuator assembly 95 further includes an elongated actuator lever 105 that extends along a longitudinal axis between an actuator handle 106 and a yoke having actuator legs 107 and 108 (FIGS. 7 and 8). The handle 106 includes a U shaped portion and a bar that connects the free ends of the U shaped portion to provide a handle that can be conveniently grasped by the operator's hand. The legs 107 and 108 each include a bore 109 which receives one of the pinions 101 and 102, to pivotly connect the actuator lever 105 to the housing 45 about a pivot axis that is perpendicular to the central axis of the actuator lever 105.

An actuator link 110 is of generally Y shaped configuration and includes a center portion having a bore 111 (FIG. 7). Associated bores 112 are provided in the legs 107 and 108, and a pinion 113 extends through the bore 111 and the bores 112 to pivotly connect the rearward end of the actuator link 110 to the actuator lever 105.

The opposed legs of the Y shaped actuator link 110 include bores 114, and the rearward end of the actuator member 96 includes a corresponding bore 115 (FIG. 7). A pinion 116 extends through the bore 115 and through bores 114, to pivotly connect the forward end of the actuator link 110 to the rearward end of the actuator member 96. Appropriate beatings, which may be polytetrafluoroethylene or other suitable material, are provided at the pivot connections, as shown in FIG. 7. With this arrangement, all of the pivot connections of the actuator assembly 95 are disposed outside of the flow path of the fluid that flows through the nozzle 11.

The seals 20, 38, 86, 91, and 98 each include an ultra high molecular weight polyethylene or polytetrafluoroethylene U-cup packing and a stainless steel helical wound coil spring disposed between the legs of the U-cup packing. These seals 20, 38, 86, 91, and 98 are commercially available from several sources. The seals 20 and 86 are each internally pressurized face seals and the seals 38, 91, and 98 are each internally pressurized lip seals. The legs of the U-cups for the seals 38, 91, and 98 may be reduced in cross-sectional thickness if desired, to enhance sealing at cryogenic temperatures (below −150° F).

FIG. 1 shows the position of the nozzle 11 and receptacle 12 when the nozzle 11 and receptacle 12 are disconnected. The nozzle inlet port 47 is connected to a source of fluid, such as a supply tank of liquid natural gas (not shown) through a flexible conduit (not shown) that extends between the supply tank and the nozzle inlet port 47. The actuator assembly 95 is locked in the position shown in FIG. 1 under these conditions, with the collar 48 in a position so that the slot 60 is not aligned with the forward edge of the actuator lever 105. In this position, the forward edge of the actuator lever 105 is captured under the rearward edge of the collar 48, so that the actuator lever 105 is locked in the position shown in FIG. 1. In this position, the nozzle valve 75 is closed, and the interface seal assembly 85 is in a retracted position. In this uncoupled position, the receptacle valve poppet assembly 35 is maintained in its closed position by the spring 41.

Figure 2:
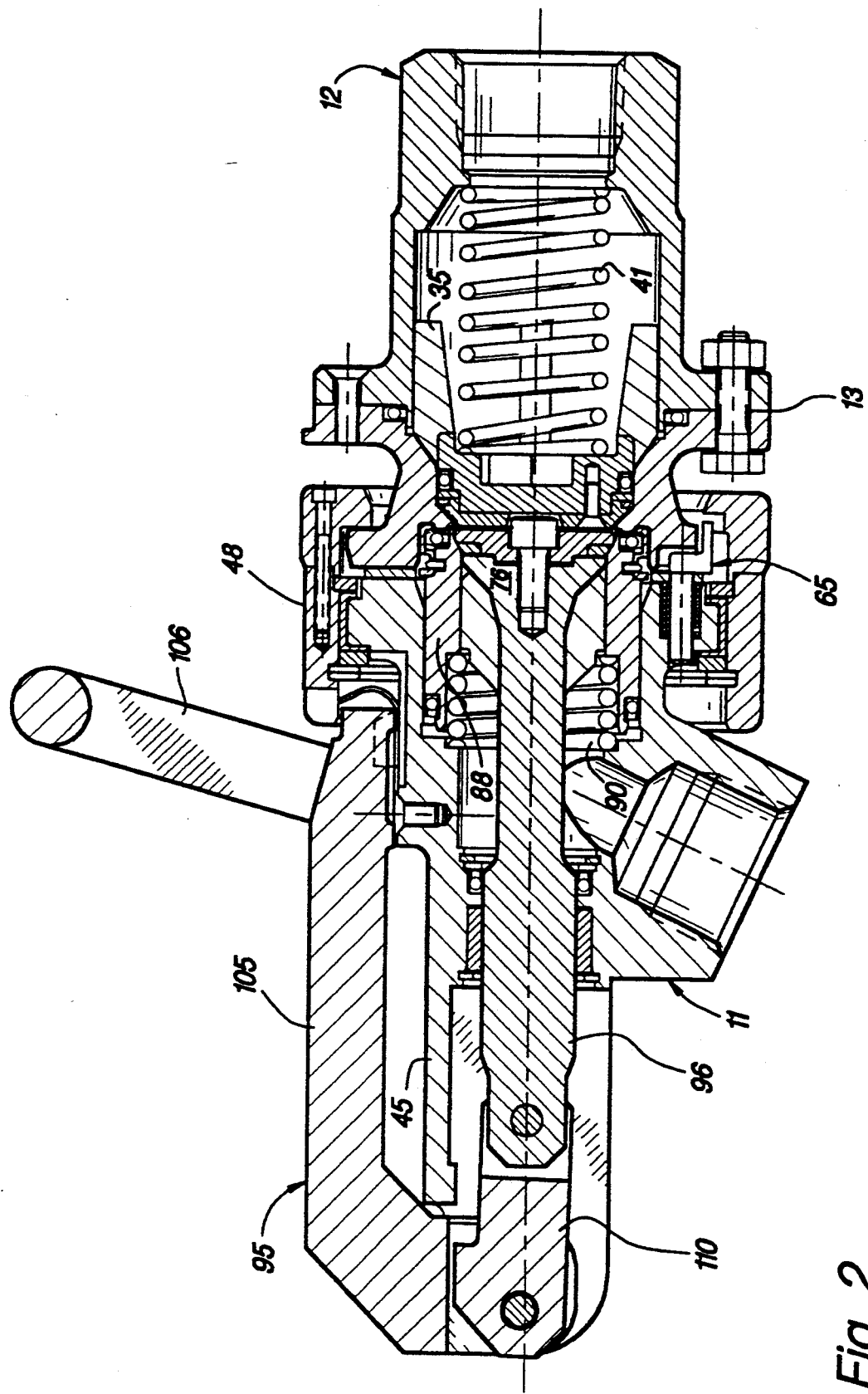
FIG. 2 is a cross-sectional side elevational view of the valved coupling according to the principles of this invention, with the nozzle and the receptacle coupled.

FIG. 2 shows the nozzle 11 and receptacle 12 in a coupled position, but with the nozzle valve 75 closed and the receptacle valve poppet assembly 35 closed and the interface seal opened. To achieve this position, the receptacle 12 and nozzle 11 are pushed together. This causes the end face 34 of the receptacle 12 (FIG. 6) to engage the locking plate 66, with the lock members 67 being received in the slots 33. The lugs 32 of the receptacle 12 (FIG. 6) are received within the slots 56 of the collar 48 (FIGS. 13 and 14). As the end surface 34 engages the locking plate 66, the locking plate 66 and lock members 67 are displaced to the left. This moves the free ends of the locking members 67 out of the slots 57 of the collar 48 (FIGS. 13 and 14) to permit rotation of the collar 48. The collar 48 is then manually rotated, until the lock members 67 engage the abutment surfaces 58, to limit rotational movement of the collar 48.

This rotation of the collar 48 performs two functions. First, it aligns the lugs 32 of the receptacle 12 with the locking surfaces 59 of the collar 48, to lock the receptacle 12 on the nozzle 11. Second, it aligns the slot 60 of the collar 48 (FIGS. 13 and 14) with the free end of the actuator lever 105 and with the locking member 61.

Figure 3:
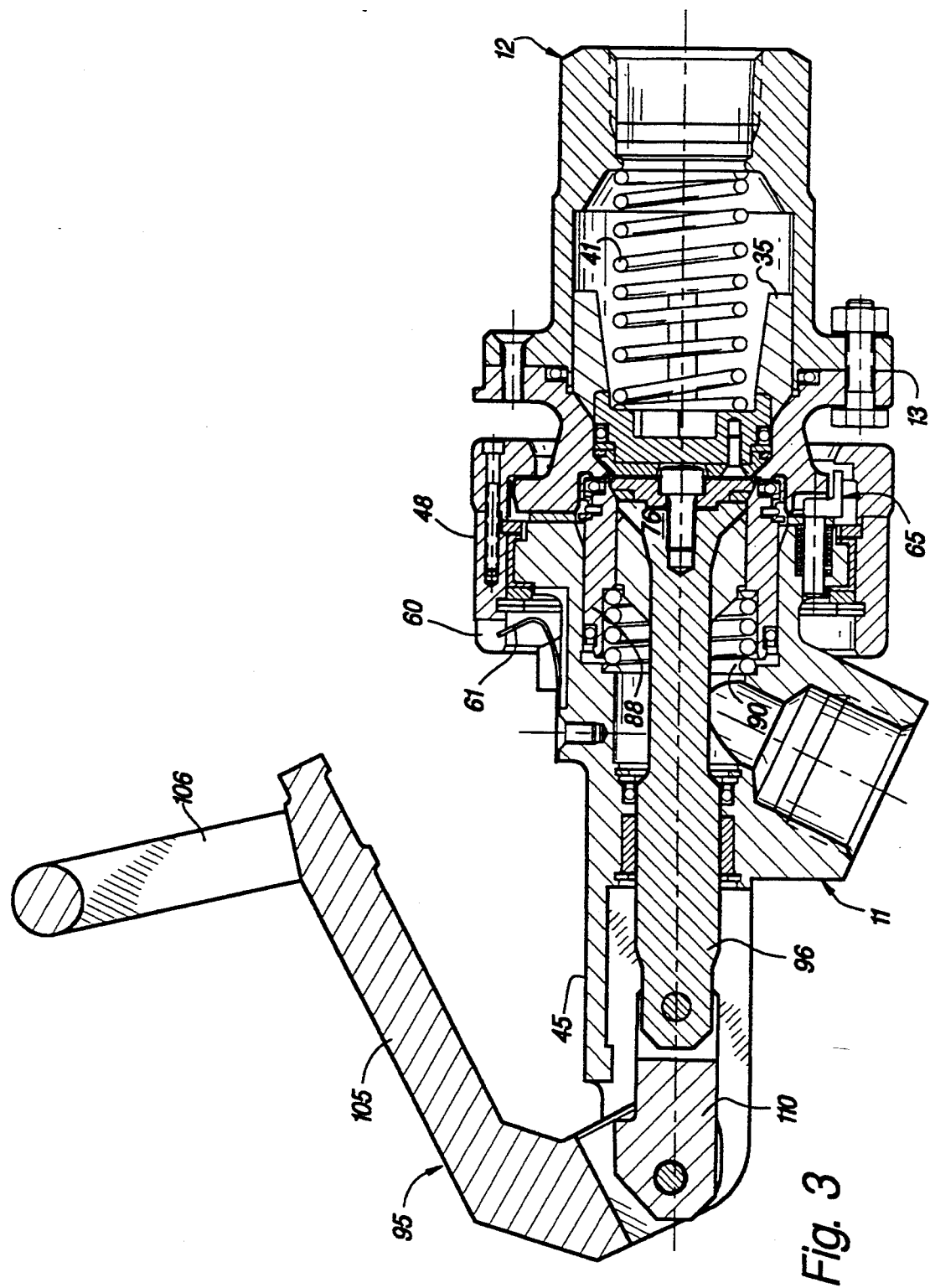
FIG. 3 is a cross-sectional side elevational view of the valved coupling according to the principles of this invention, with the nozzle and the receptacle coupled and with the interface sealing surfaces moved to an engaged position.

From this position shown in FIG. 2, the actuator lever 105 can be manually rotated to the position shown in FIG. 3. The free end of the actuator lever 105 moves out of the slot 60 of the collar 48, and the locking member 61 springs into the slot 60 to lock the collar 48 against rotation. When the actuator lever 105 is rotated to the position shown in FIG. 3, the actuator assembly 95 moves the valve poppet 76 to the right. The spring 90 pushes the carrier 88 to the right, until the interface seal 86 of the nozzle 11 engages the interface sealing surface 31 of the receptacle 12. In this position, the nozzle valve 75 and the receptacle valve poppet assembly 35 and the interface seal are all closed.

Figure 4:
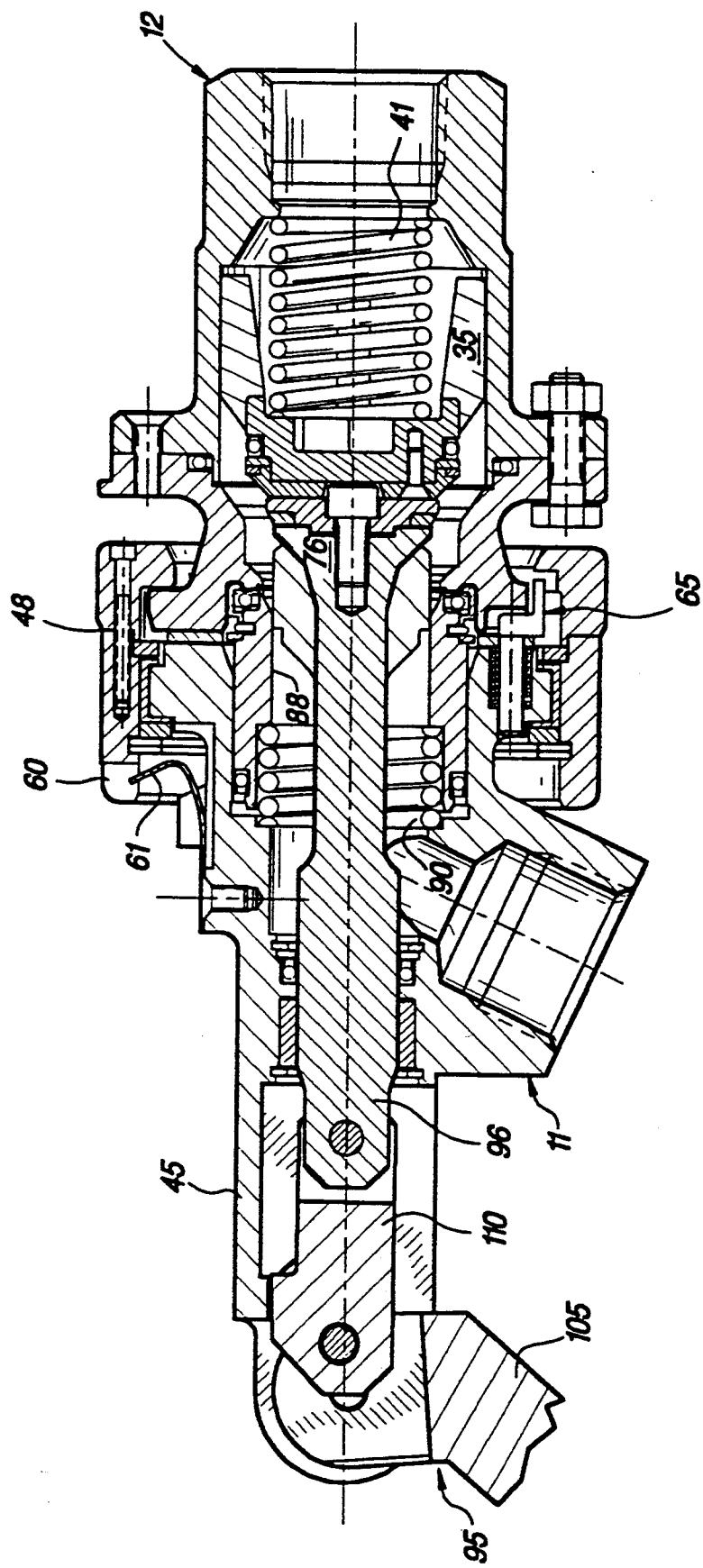
FIG. 4 is cross-sectional side elevational view of a valved coupling according to the principles of this invention, with the receptacle and the nozzle coupled, the interface sealing surfaces engaged, and the nozzle valve and receptacle valve opened.

Further rotational movement of the actuator lever 105 about its pivotal axis on the housing 45 causes the actuator assembly 95 to open both the nozzle valve 75 and the receptacle valve poppet assembly 35, while the interface seal remains closed. This position is illustrated in FIG. 4. In this position, the carrier 88 and the interface seal assembly 85 are urged to the right as viewed in FIG. 4 by the spring 90 and by fluid pressure within the bore 46 acting upon a small differential area of the carrier 88 that results from the bore 46 portion in which the carrier 88 is disposed being of slightly larger diameter than the sealing diameter of the interface seal 86. The nozzle poppet 76 engages the receptacle poppet assembly 35 and pushes against the spring 41 to open both the nozzle valve and the receptacle valve. This permits fluid to flow from the nozzle inlet 47, through the bore 46, through the spaces between adjacent guides 80, through the space between the nozzle valve poppet 76 and nozzle valve seat 79, through the space between the receptacle poppet 36 and the receptacle sealing surface 28, through the space between adjacent poppet guides 37, and to the receptacle outlet port 27. The receptacle outlet port 27 is connected to a receptacle tank (not shown) which may, for example, be a liquid natural gas tank on a bus or other vehicle or which may be any device for receiving flow from the receptacle 12.

When the flow through the coupling 10 is to be terminated and the nozzle 11 and receptacle 12 are to be uncoupled, the above described sequence is reversed. The actuator lever 105 is rotated from the position shown in FIG. 4 to the position shown in FIG. 3. When this occurs, the spring 41 pushes the receptacle poppet member 36 to the left as viewed in FIG. 3 until the retainer 40 engages the abutment surface 29. As this occurs, the ice scraper 39 moves into the cylindrical sealing surface 28, to clear any ice that has formed on the cylindrical sealing surface 28. The seal 38 follows the ice scraper 39 into the cylindrical sealing surface 28, to close the receptacle 12. As this occurs, the nozzle poppet seal 77 engages the nozzle valve seat 79, to close the nozzle valve 75. However, the spring 90 and any remaining fluid pressure in the inlet port 47 acting against the carrier 88 retains the interface seal 86 against the interface sealing surface 31 of the receptacle 12, to prevent fluid leakage between the nozzle 11 and the receptacle 12 until the nozzle valve 75 and the receptacle valve assembly 35 are fully closed.

Further rotational movement of the actuator member 96 from the position shown in FIG. 3 to the position shown in FIG. 2 displaces the carder 88 and the interface seal 86 to the left, to separate the interface seal 86 from the interface sealing surface 31. This vents any residual trapped fluid that is in the space between the nozzle valve 75 and the receptacle valve. Movement of the actuator lever 105 to the position shown in FIG. 2 causes the free end of the actuator lever 105 to enter the slot 60 of the collar 48 and to move the locking member 61 out of the slot 60. The collar 48 can then be rotated, to move the collar locking surfaces 59 away from the receptacle lugs 32, so that the lugs 32 are aligned with the slots 56 to permit disengagement of the receptacle 12 from the nozzle 11.

Figure 5:
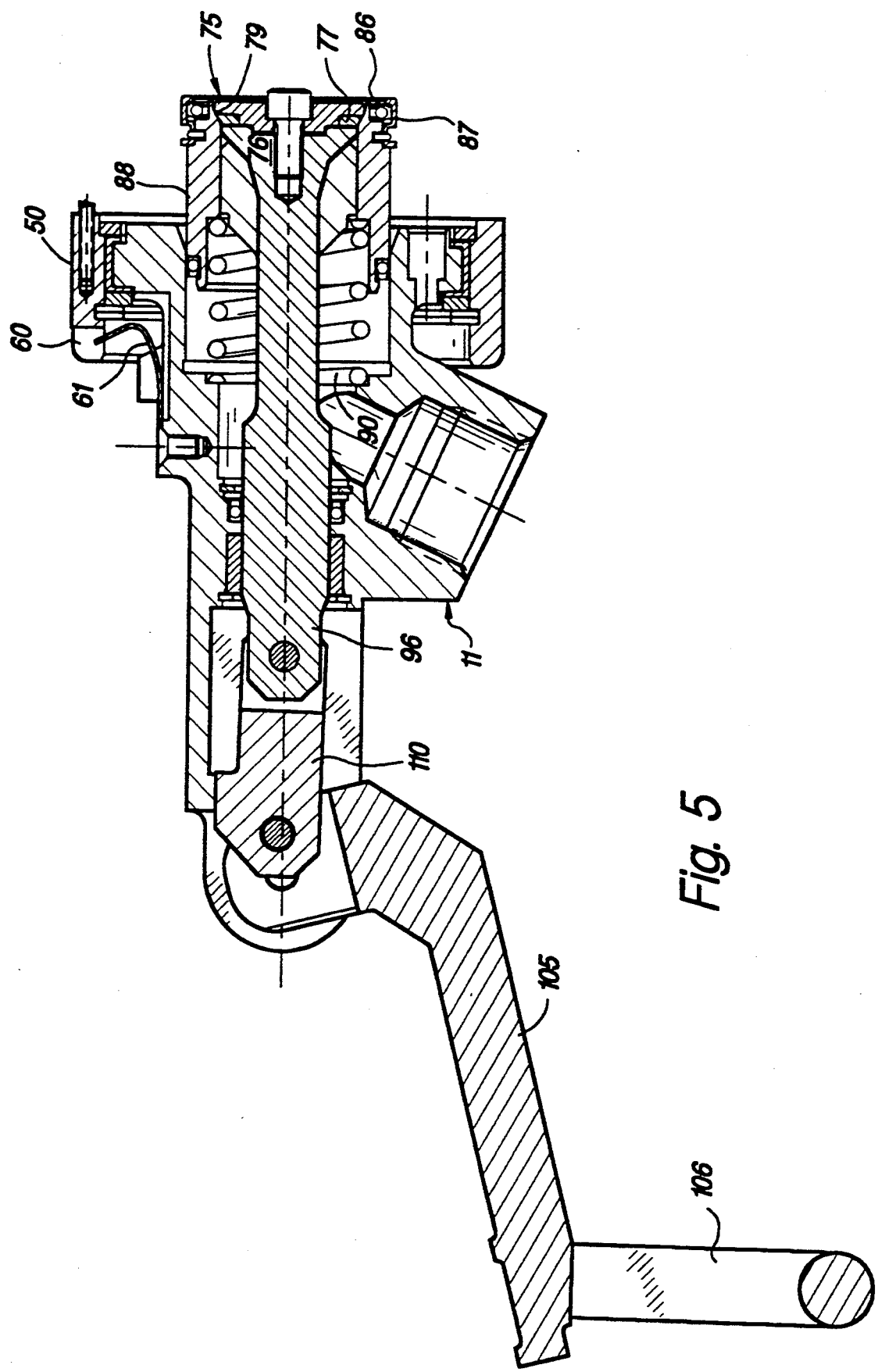
FIG. 5 is a cross-sectional side elevational view of the valved coupling according to the principles of this invention, with the receptacle and certain portions of the nozzle broken away from the nozzle housing and with the nozzle valve closed.

FIG. 5 illustrates a condition of the nozzle 11 in which the receptacle 12 has been pulled off of the nozzle 11 with the collar 48 in the locked position of FIG. 4. This would occur if a predetermined force were placed on the receptacle 12 in a direction to pull the receptacle 12 away from the coupling 11. If this occurs, the lugs 32 of the receptacle 12 will act against the locking surfaces 59 of the frangible collar portion 51 of the collar 48. The fasteners 52 will break, permitting the frangible collar portion 51 and the receptacle 12 to separate from the nozzle 11.

If this occurs, the nozzle valve 75 automatically shuts to prevent fluid flow through the fluid flow passage of the nozzle 11. The spring 90 and the fluid pressure within the nozzle fluid flow passage act against the carrier 88, to move the carrier 88 to the right as viewed in FIG. 5 until the valve seat 79 engages the seal 77 of the valve poppet 76. When this occurs, the carrier 88 effectively overtravels beyond its normal closed position shown in FIGS. 3 and 4, and the carrier 88 moves the valve seat 79 to engage the poppet 76 and provides a conduit that extends the length of the fluid flow passage in a direction to the right as viewed in FIG. 5. Additionally, the receptacle spring 41 closes the receptacle poppet assembly 35 under these conditions. Accordingly, in the event of a coupling breakage, both the receptacle valve poppet assembly 35 and the nozzle valve 75 will close, to preclude fluid leakage.

The invention has been shown and described herein with particular reference to the presently preferred embodiments of the invention. This is for the purpose of illustration rather than limitation, and variations and modifications of the invention can be made without departing from the spirit and scope of the invention as defined by the following claims.

What is claimed is:

1. A valved coupling comprising a housing, a fluid flow passage extending through said housing, a valve in said fluid flow passage axially movable between an opened position permitting fluid flow through said passage and a closed position preventing fluid flow through said passage, an interface sealing surface surrounding said passage and axially movable between an opened position and a closed position, and an actuator operably connected to said valve and to said interface sealing surface to move said interface sealing surface axially between said opened position and said closed position, said valve including two cooperating valve surfaces, said actuator including a carrier axially movable relative to said housing in said fluid flow passage, one of said cooperating valve surfaces being carried by said carrier for axial movement with said carrier, and said interface sealing surface being mounted on said carrier member separate from said one of said cooperating valve surfaces.

2. A valved coupling as set forth in claim 1, wherein one of said cooperating valve surfaces is a poppet and the other of said cooperating valve surfaces is an annular valve seat, and said annular valve seat is carried by said carrier.

3. A valved coupling as set forth in claim 2, wherein said carrier is an annular piston, said fluid flow passage includes a bore extending through said annular piston, said valve seat is disposed at one end of said bore, and said interface sealing surface is disposed on said carrier radially outwardly of said bore and adjacent said one end of said bore.

4. A valved coupling as set forth in claim 3, including a spring biasing said carrier in a direction toward said poppet.

5. A valved coupling as set forth in claim 4, including an actuator lever rotatably mounted on said housing and a link operably connecting said actuator lever and to said poppet so that rotation of said actuator lever in one direction sequentially causes movement of said interface sealing surface from said opened position to said closed position and then causes movement of said poppet from said closed position to said opened position.

6. A valved coupling as set forth in claim 1, wherein said interface sealing surface defines a radially outer area of said fluid flow passage, and said valve is disposed radially inwardly of said interface sealing surface.

7. A valved coupling as defined in claim 1, including rotatable linkage means operably connected to said valve and operably coupled to said interface sealing surface, said rotatable linkage means being rotatable in one direction to sequentially first move said valve from said opened position to said closed position and to subsequently effect movement of said interface sealing surface from said closed position to said opened position, and said rotatable linkage means being rotatable in a direction opposite said one direction to sequentially first move said interface sealing surface from said opened position to said closed position and to subsequently move said valve from said closed position to said opened position.

8. A valved coupling as set forth in claim 1, including an internally pressurized annular lip seal mounted on said carrier, and said lip seal forms said interface sealing surface.

9. A valved coupling comprising a housing, a fluid flow passage extending through said housing, a valve in said fluid flow passage axially movable between an opened position permitting fluid flow through said passage and a closed position preventing fluid flow through said passage, an interface sealing surface surrounding said passage and axially movable between an opened position and a closed position, and an actuator operably connected to said valve and to said interface sealing surface to move said interface sealing surface axially between said opened position and said closed position, said actuator including rotatable linkage means operably connected to said valve and operably coupled to said interface sealing surface, said rotatable linkage means being rotatable in one direction to sequentially first move said valve from said opened position to said closed position and to subsequently effect movement of said interface sealing surface from said closed position to said opened position, and said rotatable linkage means being rotatable in a direction opposite said one direction to sequentially first move said interface sealing surface from said opened position to said closed position and to subsequently move said valve from said closed position to said opened position, said rotatable linkage means including rotating bearing surfaces, and all said rotating bearing surfaces being disposed outside of said fluid flow passage.

10. A valved coupling as defined in claim 1, wherein a spring biases said carrier member in a direction to move said interface sealing surface toward said closed position.

11. A valved coupling as set forth in claim 10, wherein said spring acts between said housing and said carrier.

12. A valved coupling as set forth in claim 11, wherein said actuator includes rotatable linkage means operably connected to the other of said valve surfaces of said valve, said rotatable linkage means being rotatable in one direction to sequentially first move said valve from said opened position to said closed position and to subsequently effect compression of said spring and movement of said interface sealing surface from said closed position to said opened position.

13. A coupling comprising a nozzle and a receptacle, a locking surface on said nozzle and a locking surface on said receptacle, one of said locking surfaces being movable between a locked position in which said nozzle and receptacle locking surfaces engage one another to lock said nozzle and receptacle together and an unlocked position in which said nozzle and receptacle locking surfaces are spaced apart to permit separation of said nozzle and said receptacle, said nozzle including a fluid flow passage and a nozzle valve movable between an opened position permitting fluid flow through said nozzle fluid flow passage and a closed position preventing fluid flow through said nozzle fluid flow passage, said receptacle including a receptacle fluid flow passage, said nozzle and said receptacle each having an interface sealing surface, said nozzle interface sealing surface being movable between an opened position in which said nozzle interface sealing surface is spaced from said receptacle interface sealing surface to define a fluid flow path between said interface sealing surfaces and a closed position in which said nozzle interface sealing surface engages said receptacle interface sealing surface to close said fluid flow path, and an actuator operably connected to hold said nozzle interface sealing surface in said opened position when said one locking surface is moved between said locked and unlocked positions, and there being provided a passageway for venting said fluid flow path to atmosphere when said nozzle and receptacle are locked together.

14. A coupling as set forth in claim 13, wherein said interface sealing surfaces are generally annular and are disposed radially outward of said nozzle valve.

15. A coupling as set forth in claim 13 wherein said actuator is operably connected to said nozzle interface sealing surface and to said nozzle valve to move said nozzle interface sealing surface from said opened position to said closed position before said nozzle valve is moved from said closed position to said opened position.

16. A coupling comprising a nozzle and a receptacle, a locking surface on said nozzle and a locking surface on said receptacle, one of said locking surfaces being movable between a locked position in which said nozzle and receptacle locking surfaces engage one another to lock said nozzle and receptacle together and an unlocked position in which said nozzle and receptacle locking surfaces are spaced apart to permit separation of said nozzle and said receptacle, said nozzle including a fluid flow passage and a nozzle valve movable between an opened position permitting fluid flow through said nozzle fluid flow passage and a closed position preventing fluid flow through said nozzle fluid flow passage, said receptacle including a receptacle fluid flow passage, said nozzle and said receptacle each having an interface sealing surface, said nozzle interface sealing surface being movable between an opened position in which said nozzle interface sealing surface is spaced from said receptacle interface sealing surface to define a fluid flow path between said interface sealing surfaces and a closed position in which said nozzle interface sealing surface engages said receptacle interface sealing surface to close said fluid flow path, and an actuator operably connected to hold said nozzle interface sealing surface in said opened position when said one locking surface is moved between said locked and unlocked positions, said actuator being operably connected to said nozzle interface sealing surface and to said nozzle valve to move said nozzle interface sealing surface from said opened position to said closed position before said nozzle valve is moved from said closed position to said opened position, and said nozzle including interlock means locking said nozzle interface sealing surface in said opened position and said nozzle valve in said closed position when said nozzle locking surface is in said unlocked position.

17. A coupling as set forth in claim 16, wherein said interlock means moves said nozzle interface sealing surface from said closed position to said opened position before said nozzle and receptacle locking surfaces can be moved from said locked position to said unlocked position.

18. A coupling as set forth in claim 16, wherein said nozzle includes a housing, said interlock means includes an annular collar and an elongated link, said collar carries said nozzle locking surface, said collar is rotatably mounted on said nozzle housing, said elongated link includes a central axis and a pivot portion pivotally mounted on said housing about an axis generally perpendicular to said central axis, said elongated link including an interlock portion spaced from said pivot portion and rotatably movable around said pivot portion, said interlock portion and said collar each having interlock surfaces, and said interlock surfaces engaging to prevent rotatable movement of said elongated link when said nozzle and receptacle locking surfaces are spaced apart.

19. A coupling as defined in claim 18, wherein said interlock means includes a rotatable linkage operable connected to said elongated link and to said nozzle valve and to said nozzle interface sealing surface.

20. A coupling as defined in claim 19, wherein said rotatable linkage includes rotating bearing surfaces, and all said rotating bearing surfaces are disposed outside of said nozzle fluid flow passage.

21. A coupling comprising a housing, a fluid flow passage through said housing, a carrier slidably disposed for axial movement in said passage, a spring urging said carrier in one direction in said passage, a first valve member carried by said carrier for axial movement in said passage with said carrier, a second valve member slidably disposed for axial movement in said passage, an actuator operably connected to said second valve member to move said second valve member axially between first and second positions relative to said housing, said second position being axially spaced from said first position in said one direction, said first valve member being spring biased against said second valve member by said spring to prevent fluid flow through said passage when said second valve member is in said first position, a coupling member releasably connected to said housing and operably engaging said carrier to limit axial movement of said carrier in said one direction when said coupling member is releasably connected to said housing and said second valve member is in said second position, said second valve member being axially spaced from said first valve member in said one direction when said coupling member is releasably connected to said housing and said second valve member is in said second position to permit fluid flow through said housing, and said first valve member being axially displaced in said one direction and being spring biased against said second valve member by said spring to prevent fluid flow through said passage when said second valve member is in said second position and said coupling member is disconnected from said housing.

22. A coupling as set forth in claim 21, wherein said housing includes an exterior surface, said passage terminates adjacent said exterior surface, said carrier has a generally cylindrical outer surface and a generally cylindrical inner surface, a seal is disposed between and prevents fluid flow between said passage and said outer surface, and said inner surface provides a conduit to confine and carry fluid from said termination of said passage to said second valve member when said second valve member is in said second position and said coupling member is disconnected from said housing.

23. A coupling as set forth in claim 22, wherein said carrier and said coupling member each include an interface sealing surface, and said interface sealing surfaces engage to prevent fluid leakage between said housing and said coupling member when said coupling member is releasably attached to said housing and said coupling second valve member is in said second position.

24. A coupling as set forth in claim 21, including a locking surface on said housing for locking said housing to said coupling member when said coupling member is releasably connected to said housing, and a frangible connection frangibly connecting said locking surface to said housing so that a predetermined force acting on said locking surface in a direction away from said housing will cause said frangible connection to break and thereby will cause said locking surface to separate from said housing to permit separation of said coupling member from said housing.

25. A coupling as set forth in claim 24, including a generally annular collar rotatably disposed on said housing, and said locking surface is carried by said annular collar.

26. A coupling as set forth in claim 25, wherein said collar is of two separate piece construction including a first annular portion and a second annular portion, a rotatable connector rotatably connects said first annular portion to said housing, said locking surface is carried by said second annular portion, and said frangible connection includes a fastener affixing said first and second annular portions.

27. A quick connect valved nozzle comprising a housing, a fluid flow passage through said housing, a nozzle valve in said fluid flow passage axially movable between an opened position permitting fluid flow through said passage and a closed position preventing fluid flow through said passage, an elongated link on the outside of said housing having a central axis, a first pivot connection adjacent one end of said elongated link pivotally connecting said one end to said housing about an axis perpendicular to said central axis to permit rotational movement of said elongated link toward and away from a closed position, a second pivot connection adjacent said one end of said elongated link pivotally connecting said one end to another link, and said other link being operably connected to said nozzle valve to move said nozzle valve between said opened and closed positions as said elongated link is rotated about said first pivot connection.

28. A quick connect valved nozzle as set forth in claim 27, including at least one other pivot connection pivotally connecting said other link and said nozzle valve, and all of said pivot connections being disposed outside of said fluid flow passage.

29. A quick connect valved nozzle as set forth in claim 27, said elongated link including a first interlock surface, a collar rotatably disposed on said housing, said collar including a second interlock surface movable by rotation of said collar between a locked position in which said second interlock surface of said collar engages said first interlock surface of said elongated link to lock said elongated link in said closed position.

30. A quick connect valved nozzle as set forth in claim 29, including a third interlock surface operably connected to said elongated link and movable by rotational movement of said elongated link toward and away from a collar locking position in which said third interlock surface engages said collar to prevent rotation of said collar when said first and second interlock surfaces are spaced apart and said elongated link is moved away from its closed position.

31. A valve for controlling the flow of cryogenic fluids comprising a housing, a fluid inlet and a fluid outlet in said housing, a fluid passage in said housing extending between said inlet and said outlet, said passage including a generally cylindrical sealing wall surface, a valve element slidably disposed for axial movement in said sealing wall surface, a seal carried by said valve element and sealing against said sealing wall surface around its entire circumferential extent, and a rigid annular scraper carried by said valve element and engaging said sealing wall surface around its entire circumferential extent.

32. A valve as set forth in claim 31, wherein said passage includes another portion adjacent said sealing wall surface, said other portion is of larger diameter than the diameter of said sealing wall surface, said valve element is a valve poppet, and said valve poppet being movable into said other portion to permit fluid flow through said passage.

* * * * *